(12) United States Patent
Mohiseen et al.

(10) Patent No.: US 12,229,537 B2
(45) Date of Patent: *Feb. 18, 2025

(54) METHOD AND APPARATUS FOR AUTOMATICALLY GENERATING AN APPLICATION CODE AND FRAMEWORK

(71) Applicant: JPMorgan Chase Bank, N.A., New York, NY (US)

(72) Inventors: Mohammed Ahamed Mohiseen, Hyderabad (IN); Rohit Nilekar, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 96 days.

This patent is subject to a terminal disclaimer.

(21) Appl. No.: 18/202,342

(22) Filed: May 26, 2023

(65) Prior Publication Data

US 2023/0305820 A1    Sep. 28, 2023

Related U.S. Application Data

(63) Continuation of application No. 17/447,857, filed on Sep. 16, 2021, now Pat. No. 11,698,777.

(Continued)

(30) Foreign Application Priority Data

Sep. 22, 2020   (IN) .............................. 202011040940

(51) Int. Cl.
    *G06F 8/36*  (2018.01)
    *G06F 8/10*  (2018.01)
    (Continued)

(52) U.S. Cl.
    CPC .................. *G06F 8/36* (2013.01); *G06F 8/10* (2013.01); *G06F 11/3684* (2013.01); *G06F 40/205* (2020.01); *G06N 20/00* (2019.01)

(58) Field of Classification Search
    CPC ............ G06F 8/36; G06F 40/205; G06F 8/10
    (Continued)

(56) References Cited

U.S. PATENT DOCUMENTS 6,212,672 B1    4/2001   Keller et al.
6,275,976 B1 *  8/2001   Scandura ............ G06F 11/3696
                                                717/126

(Continued)

OTHER PUBLICATIONS

Hassan et al, "Automatic Building of Java Projects in Software Repositories: A Study on Feasibility and Challenges", IEEE, pp. 38-47 (Year: 2017).*

(Continued)

*Primary Examiner* — Anil Khatri
(74) *Attorney, Agent, or Firm* — GREENBLUM & BERNSTEIN, P.L.C.

(57) ABSTRACT

Various methods, apparatuses/systems, and media for automatically building an application framework are disclosed. An internal database stores available design patterns and code snippets for developing an application. A receiver receives, as input, a requirement document that includes one or more requirements for developing the application. A processor parses the requirement document by implementing a natural language processing algorithm; creates, based on the parsed requirement document, a plurality of code blocks for generating a structure and a design pattern to be used to develop the application by matching the one or more requirements with the available design patterns; accesses the database to obtain the code snippets for the plurality of code blocks; and automatically builds an application framework based on the code snippets.

17 Claims, 6 Drawing Sheets

Related U.S. Application Data (60) Provisional application No. 63/110,018, filed on Nov. 5, 2020.

(51) Int. Cl.
*G06F 11/36* (2006.01)
*G06F 40/205* (2020.01)
*G06N 20/00* (2019.01)

(58) Field of Classification Search
USPC .................................................. 717/107–121
See application file for complete search history.

(56) References Cited

U.S. PATENT DOCUMENTS

| | | | |
|---|---|---|---|
| 8,219,968 B2 | 7/2012 | O'Brien | |
| 8,359,572 B2* | 1/2013 | Mital | G06F 8/36 |
| | | | 717/162 |
| 9,032,373 B1 | 5/2015 | Gupta et al. | |
| 9,239,707 B2 | 1/2016 | Yu et al. | |
| 9,286,179 B1* | 3/2016 | Shalla | G06F 11/26 |
| 9,419,884 B1 | 8/2016 | Li et al. | |
| 10,114,637 B1* | 10/2018 | Willson | G06F 8/71 |
| 10,318,412 B1* | 6/2019 | McKearney, Jr. | G06F 8/60 |
| 10,387,627 B2* | 8/2019 | Johnson | G06F 21/316 |
| 10,402,757 B1* | 9/2019 | Shah | G06F 11/3616 |
| 10,437,572 B1 | 10/2019 | Ghaleb et al. | |
| 10,467,121 B2* | 11/2019 | Natari | G06F 11/3688 |
| 10,540,267 B2 | 1/2020 | Wojciak et al. | |
| 10,838,846 B1* | 11/2020 | Saleh-Esa | G06F 11/3604 |
| 10,957,310 B1* | 3/2021 | Mohajer | G10L 15/06 |
| 11,061,806 B2 | 7/2021 | Viswanathan et al. | |
| 11,182,279 B1 | 11/2021 | Hicks et al. | |
| 11,500,763 B1 | 11/2022 | Petrescu et al. | |
| 11,561,889 B2 | 1/2023 | De Sousa Bispo et al. | |
| 11,681,505 B2* | 6/2023 | Mukherjee | G06F 8/60 |
| | | | 717/107 |
| 11,847,574 B2* | 12/2023 | Merrill | G06F 40/56 |
| 2020/0401382 A1 | 12/2020 | Briggs et al. | |

OTHER PUBLICATIONS

Wang et al, "Build an Auto Testing Framework Based on Selenium and FitNesse", IEEE, pp. 436-439 (Year: 2009).*

Shuaishuai et al, "An Automatic Testing Framework for Embedded Software", IEEE, pp. 269-274 (Year: 2017).*

Feichtinger et al, "Applying Software Product Line Techniques to an Integrated Circuit System Modelling Framework: An Experience Report", ACM, pp. 164-169 (Year: 2024).*

Caiza et al, "A framework and roadmap for enhancing the application of privacy design patterns", ACM, pp. 1297-1304 (Year: 2020).

Maia et al, "Framework for building intelligent mobile social applications", ACM, pp. 525-530 (Year: 2012).

Hamdy et al, "Topic Modelling for Automatic Selection of Software Design Patterns", ACM, pp. 41-46 (Year: 2018).

Li et al, "Automatic Detection of Design Pattern for Reverse Engineering", IEEE, pp. 577-583 (Year: 2007).

Schmidt, "Using Design Patterns to Develop Reusable Object-Oriented Communication Software", ACM pp. 65-74 (Year: 1995).

Yang et al, "From Query to Usable Code: An Analysis of Stack Overflow Code Snippets", ACM, pp. 391-401 (Year: 2016).

* cited by examiner

METHOD AND APPARATUS FOR AUTOMATICALLY GENERATING AN APPLICATION CODE AND FRAMEWORK

CROSS-REFERENCE TO RELATED APPLICATIONS

This application is a Continuation of U.S. patent application Ser. No. 17/447,857, filed Sep. 16, 2021, which claims the benefit of priority from U.S. Provisional Patent Application No. 63/110,018, filed Nov. 5, 2020, and from India Provisional Patent Application No. 202011040940, filed Sep. 22, 2020. The disclosure of each of these documents, including the specification, drawings, and claims, is incorporated herein by reference in its entirety.

TECHNICAL FIELD

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

This disclosure generally relates to application development, and, more particularly, to methods and apparatuses for implementing an automated developer module that automatically builds an application framework by utilizing requirement document as input, thereby improving efficiency and productivity in developing an application.

BACKGROUND

Today, across the multiple lines of businesses (LOB) at an organization, application developers are constantly faced with a daunting task of developing new applications for improving customer experience as well as productivity. Often, when an application development team decides to develop applications in new technologies, the immediate response that may come to management's mind is to hire resources of that technology, whereas the difference between that technology and other technology may only be syntax, but the core logic and object oriented programming may be the same across all technologies. Thus, today, an application development team may end up stressing more on learning the same thing that is already in place, wasting time in writing frameworks and patterns when they are already in place, and spending unnecessary time to write the syntax rather than concentrating on the business logic and innovative algorithms.

In addition, as every basic necessities (e.g., cars, tv, home appliances, etc.) is moving towards speech recognition or voice command control, conventional tools for developing and writing codes do not offer such speech recognition or voice command control capabilities to write codes for developing an application.

SUMMARY

The present disclosure, through one or more of its various aspects, embodiments, and/or specific features or sub-components, may provide, among others, various systems, servers, devices, methods, media, programs, and platforms for implementing an automated developer module that automatically builds an application framework by utilizing requirement document as input, thereby improving efficiency and productivity in developing an application, but the disclosure is not limited thereto. According to exemplary embodiments, the automated developer module may be a platform which helps developers and non-developers in developing applications giving the requirement document as input and get at least 30%-60% developed product as output within no time, but the disclosure is not limited thereto. The automated developer module may be configured to match the requirement with the available design patterns and create a strong framework at start itself, thereby reducing at least 50% of teams' effort in developing applications, but the disclosure is not limited thereto.

According to an aspect of the present disclosure, a method for automatically building an application framework by utilizing one or more processors and one or more memories is disclosed. The method may include: providing a database that stores available design patterns and code snippets for developing an application; receiving, as input, a requirement document that includes one or more requirements for developing the application; parsing the requirement document by implementing a natural language processing algorithm; creating, based on the parsed requirement document, a plurality of code blocks for generating a structure and a design pattern to be used to develop the application by matching the one or more requirements with the available design patterns; accessing the database to obtain the code snippets for the plurality of code blocks; and automatically building an application framework based on the code snippets.

According to another aspect of the present disclosure, wherein the application framework may be output as an at least 30%-60% developed product in completing the application.

According to yet another aspect of the present disclosure, the method may further include: completing code implementation for all of the plurality of code blocks; and automatically writing unit test cases to achieve at least 90% test coverage.

According to an aspect of the present disclosure, the method may further include: receiving, as input, voice commands for generating codes that are utilized to develop the application.

According to further aspect of the present disclosure, the method may further include: deploying the application framework to a plurality of pools and environments at a time.

According to yet another aspect of the present disclosure, the method may further include: implementing artificial intelligence and machine learning algorithms to process the received requirement document, and building the application framework based on the requirement document.

According to yet another aspect of the present disclosure, a system for automatically building an application framework is disclosed. The system may include a database that stores available design patterns and code snippets for developing an application, and a processor operatively connected to the database via a communication network. The processor may be configured to: receive, as input, a requirement document that includes one or more requirements for developing the application; parse the requirement document by implementing a natural language processing algorithm; create, based on the parsed requirement document, a plurality of code blocks for generating a structure and a design pattern to be used to develop the application by matching the one or more requirements with the available design patterns; access the database to obtain the code snippets for the plurality of code blocks; and automatically build an application framework based on the code snippets.

According to an additional aspect of the present disclosure, the processor may be further configured to complete code implementation for all of the plurality of code blocks; and automatically write unit test cases to achieve at least 90% test coverage.

According to an aspect of the present disclosure, the processor may be further configured to complete receive, as input, voice commands for generating codes that are utilized to develop the application.

According to further aspect of the present disclosure, the processor may be further configured to complete deploy the application framework to a plurality of pools and environments at a time.

According to yet another aspect of the present disclosure, the processor may be further configured to complete implement artificial intelligence and machine learning algorithms to process the received requirement document, and build the application framework based on the requirement document.

According to a further aspect of the present disclosure, a non-transitory computer readable medium configured to store instructions for automatically building an application framework is disclosed. The instructions, when executed, may cause a processor to perform the following: receiving, as input, a requirement document that includes one or mom requirements for developing an application; parsing the requirement document by implementing a natural language processing algorithm; creating, based on the parsed requirement document, a plurality of code blocks for generating a structure and a design pattern to be used to develop the application by matching the one or more requirements with available design patterns; accessing a database to obtain the code snippets for the plurality of code blocks; and automatically building an application framework based on the code snippets.

According to yet another aspect of the present disclosure, the instructions, when executed, may further case the processor to perform the following: completing code implementation for all of the plurality of code blocks; and automatically writing unit test cases to achieve at least 90% test coverage.

According to an aspect of the present disclosure, the instructions, when executed, may further case the processor to perform the following: receiving, as input, voice commands for generating codes that are utilized to develop the application.

According to further aspect of the present disclosure, the instructions, when executed, may further case the processor to perform the following: deploying the application framework to a plurality of pools and environments at a time.

According to yet another aspect of the present disclosure, the instructions, when executed, may further case the processor to perform the following: implementing artificial intelligence and machine learning algorithms to process the received requirement document, and building the application framework based on the requirement document.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, engines, tools, devices and/or modules. Those skilled in the art will appreciate that these blocks, units, engines, tools, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, engines, tools, devices, and/or modules being implemented by microprocessors or similar, they may be programmed using software (e.g., microcode) to perform various functions discussed herein and may optionally be driven by firmware and/or software. Alternatively, each block, unit, engine, tool device, and/or module may be implemented by dedicated hardware, or as a combination of dedicated hardware to perform some functions and a processor (e.g., one or more programmed microprocessors and associated circuitry) to perform other functions. Also, each block, unit, engine, tool, device, and/or module of the example embodiments may be physically separated into two or more interacting and discrete blocks, units, engines, tools, devices, and/or modules without departing from the scope of the inventive concepts. Further, the blocks, units, engines, tools, devices, and/or modules of the example embodiments may be physically combined into more complex blocks, units, engines, tools, devices, and/or modules without departing from the scope of the present disclosure.

Figure 1:
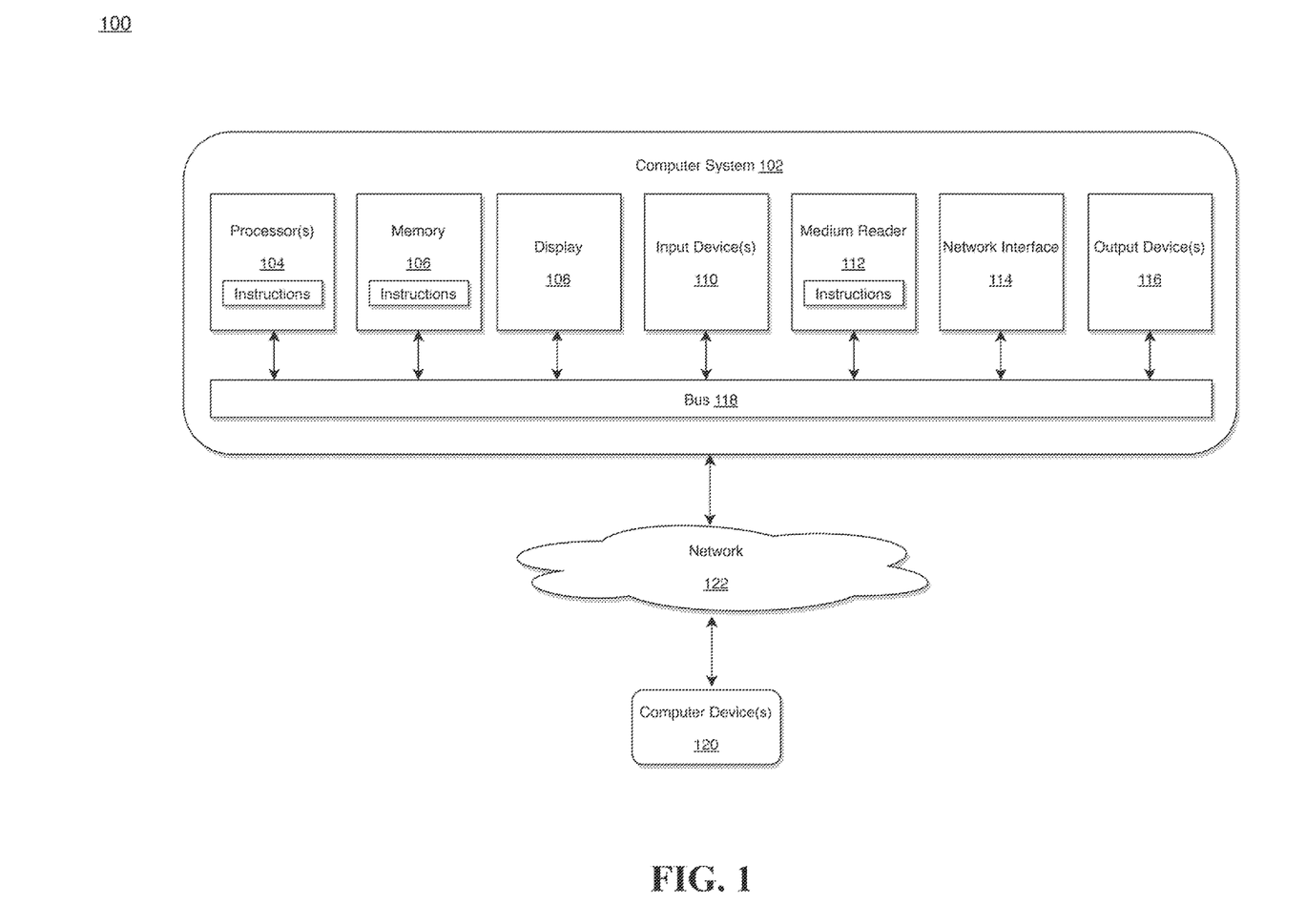
FIG. 1 illustrates a computer system for implementing an automated developer module in accordance with an exemplary embodiment.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing an automated developer module that automatically builds an application framework by utilizing requirement document as input, thereby improving efficiency and productivity in developing an application, but the disclosure is not limited thereto. According to exemplary embodiments, the automated developer module is a platform which helps developers and non-developers in developing applications giving the requirement document as input and get at least 30%-60% developed product as output within no time, but the disclosure is not limited thereto. The automated developer module may be configured to match the requirement with the available design patterns and create a strong framework at start itself, thereby reducing at least 50% of teams' effort in developing applications, but the disclosure is not limited thereto.

Figure 2:
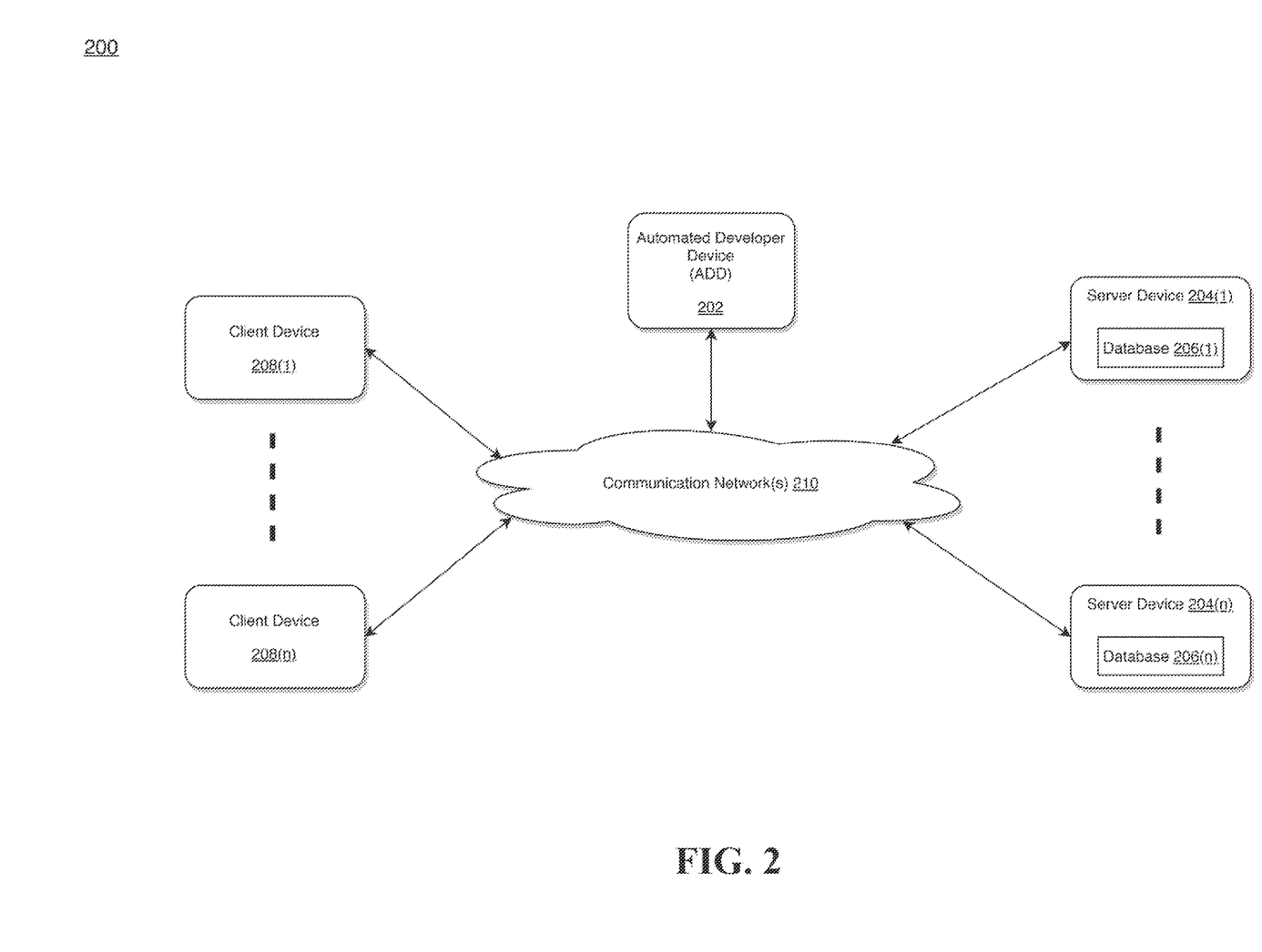
FIG. 2 illustrates an exemplary network diagram of an automated developer device in accordance with an exemplary embodiment.

Referring to FIG. 2, a schematic of an exemplary network environment 200 for implementing an automated developer device (ADD) of the instant disclosure is illustrated.

According to exemplary embodiments, the above-described problems associated with conventional system may be overcome by implementing an ADD 202 as illustrated in FIG. 2 to automatically build an application framework by utilizing requirement document as input, thereby improving efficiency and productivity in developing an application, but the disclosure is not limited thereto.

The ADD 202 may be the same or similar to the computer system 102 as described with respect to FIG. 1.

The ADD 202 may store one or more applications that can include executable instructions that, when executed by the ADD 202, cause the ADD 202 to perform actions, such as to transmit, receive, or otherwise process network messages, for example, and to perform other actions described and illustrated below with reference to the figures. The application(s) may be implemented as modules or components of other applications. Further, the application(s) can be implemented as extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ADD 202 itself, may be located in virtual server(s) running in a cloud-based computing environment rather than being tied to one or more specific physical network computing devices. Also, the application(s) may be running in one or more virtual machines (VMs) executing on the ADD 202. Additionally, in one or more embodiments of this technology, virtual machine(s) running on the ADD 202 may be managed or supervised by a hypervisor.

In the network environment 200 of FIG. 2, the ACD 202 is coupled to a plurality of server devices 204(1)-204(n) that hosts a plurality of databases 206(1)-206(n), and also to a plurality of client devices 208(1)-208(n) via communication network(s) 210. A communication interface of the ADD 202, such as the network interface 114 of the computer system 102 of FIG. 1, operatively couples and communicates between the ADD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ADD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s)(WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, tele-traffic in any suitable form (e.g., voice, modem, and the like), Public Switched Telephone Network (PSTNs). Ethernet-based Packet Data Networks (PDNs), combinations thereof, and the like.

The ADD 202 may be a standalone device or integrated with one or more other devices or apparatuses, such as one or more of the server devices 204(1)-204(n), for example. In one particular example, the ADD 202 may be hosted by one of the server devices 204(1)-204(n), and other arrangements are also possible. Moreover, one or more of the devices of the ADD 202 may be hosted in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ADD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include specific type of computing device that can facilitate the implementation of the ADD 202 that may automatically build an application framework by utilizing requirement document as input, thereby improving efficiency and productivity in developing an application, but the disclosure is not limited thereto.

Accordingly, the client devices 208(1)-208(n) may be mobile computing devices, desktop computing devices, laptop computing devices, tablet computing devices, virtual machines (including cloud-based computers), for example.

The client devices 208(1)-208(n) may run interface applications, such as standard web browsers or standalone client applications, which may provide an interface to communicate with the ADD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ADD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADD 202, the server devices 204(1)-204(n), or the client devices 208(1)-208(n), for example, may be configured to operate as virtual instances on the same physical machine. For example, one or more of the ADD 202, the server devices 204(1)-204(n), or the client devices 208(1)-208(n) may operate on the same physical device rather than as separate devices communicating through communication network(s) 210. Additionally, there may be more or fewer ADD 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only tele-traffic in any suitable form (e.g., voice and modem), wireless traffic networks, cellular traffic networks, Packet Data Networks (PDNs), the Internet, intranets, and combinations thereof.

Figure 3:
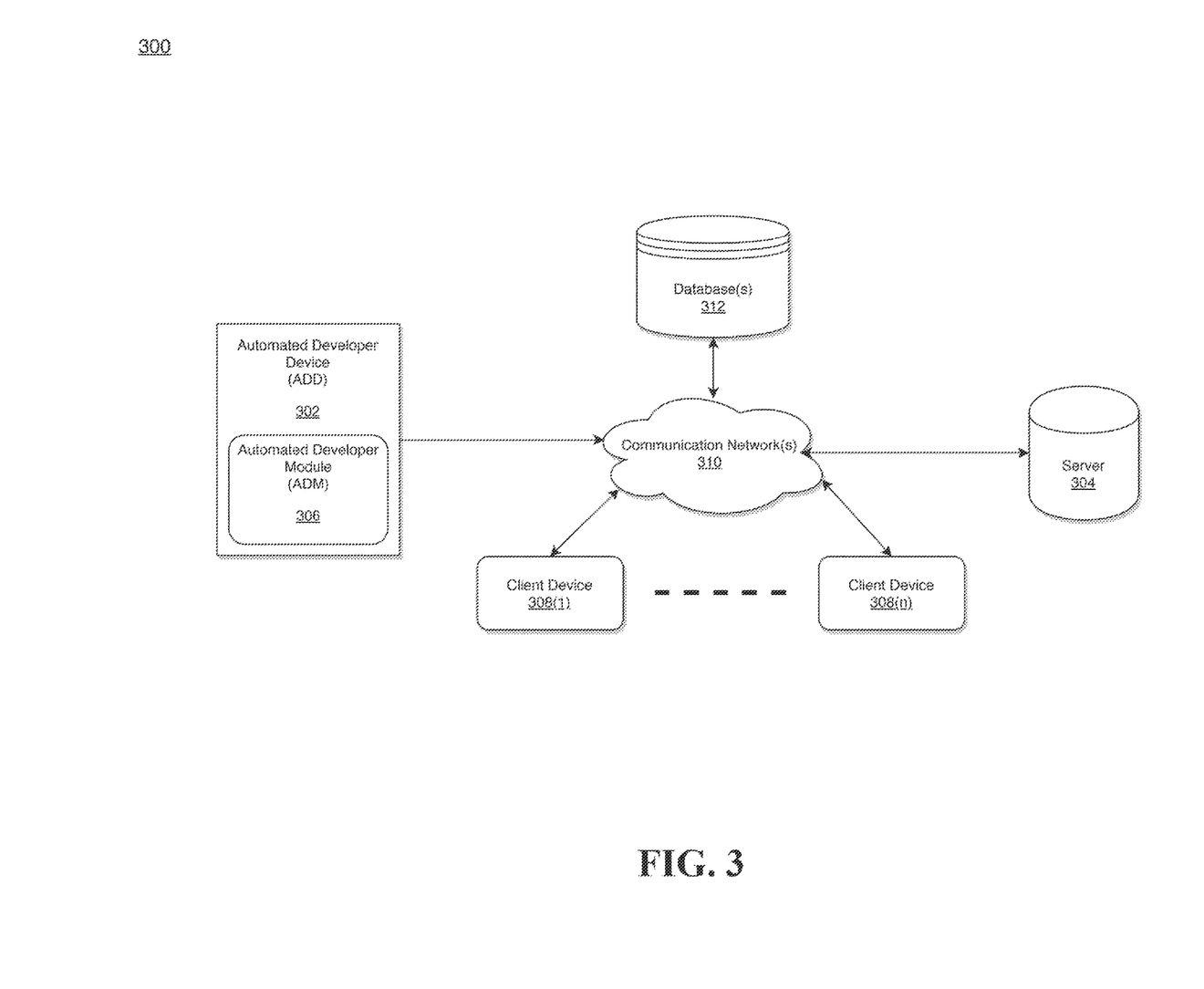
FIG. 3 illustrates a system diagram for implementing an automated developer device with a meeting efficiency index generating module in accordance with an exemplary embodiment.
Figure 4:
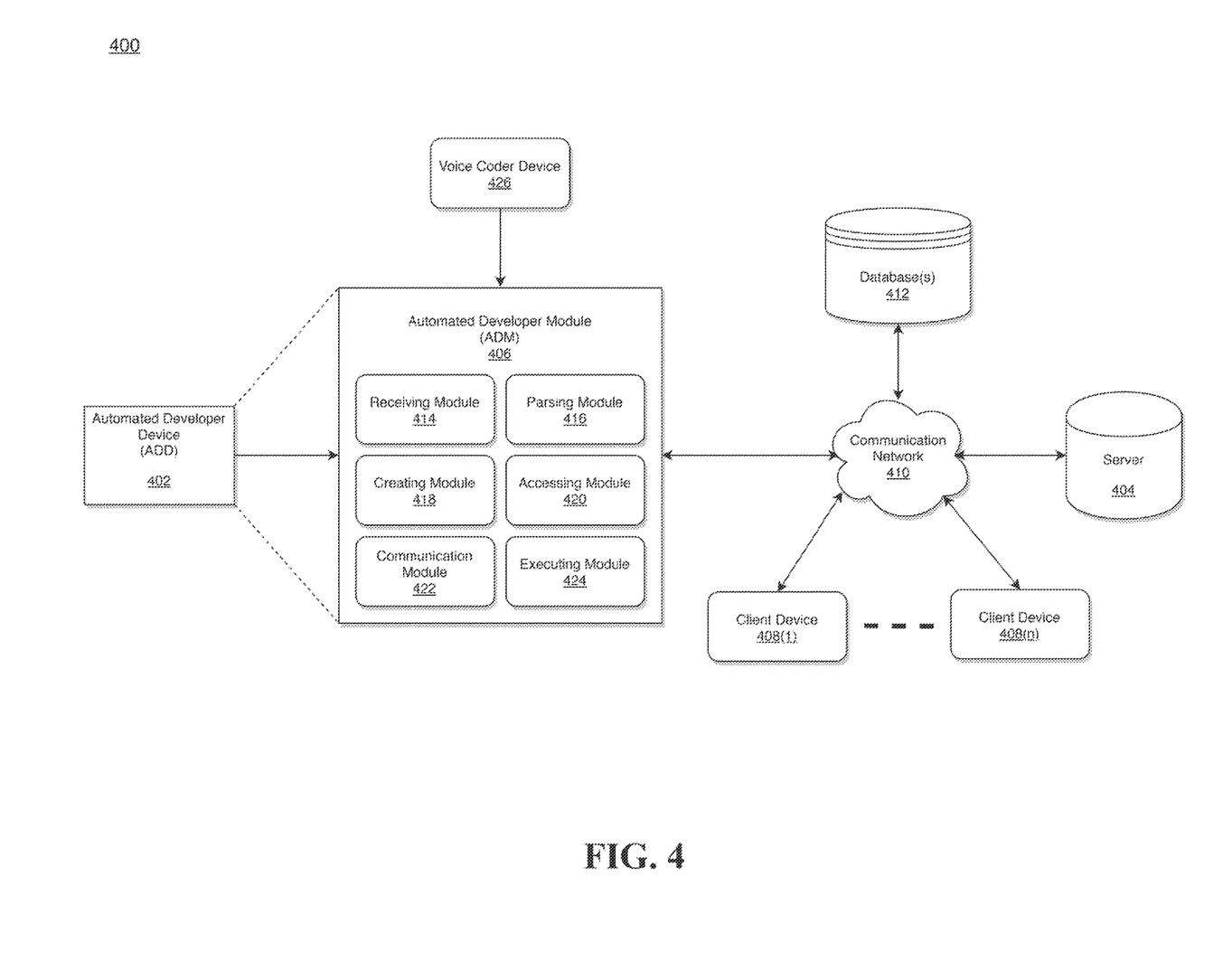
FIG. 4 illustrates a system diagram for implementing the automated developer module of FIG. 3 in accordance with an exemplary embodiment.

FIG. 3 illustrates a system diagram for implementing a meeting efficiency index generating device (ADD) with a meeting efficiency index generating module (ADM) in accordance with an exemplary embodiment. According to exemplary embodiments, the ADM may be implemented locally and the local ADM may include tools/module to generate the meeting efficiency index as illustrated in FIG. 4.

As illustrated in FIG. 3, in the system 300, according to exemplary embodiments, the ADD 302 along with the ADM 306 may be connected to a server 304 and database(s) 312 via a communication network 310, but the disclosure is not limited thereto. For example, according to exemplary embodiments, the ADD 302 may be connected to any desired databases besides the server 304 and the database(s) 312.

According to exemplary embodiments, the server 304 and the database(s) 312 may include memories that may store available design patterns and code snippets for developing an application, but the disclosure is not limited thereto.

According to exemplary embodiment, the ADD 302 may include other rules, policies, modules, databases, or applications, for example. According to exemplary embodiments, the server 304 may be configured to store information including the metadata, but the disclosure is not limited thereto. According to exemplary embodiments, ADD 302 may contain multiple stages connecting to various other tools to perform the required processes.

According to exemplary embodiments, the ADD 302 may be configured to receive continuous feed of data from the server 304 and the database(s) 312 via the communication network 310. According to exemplary embodiments, the ADD 302 may also be configured to communicate with one or more client devices 308(1)-308(n) (e.g., user's devices, application developing devices, etc.) via the communication network 310, but the disclosure is not limited thereto. According to exemplary embodiments, the client devices 308(1)-308(n) may also be referred to as organizer's systems/devices.

As will be described below, the ADM 306 may be configured to receive, as input, a requirement document that includes one or more requirements for developing the application; parsing the requirement document by implementing a natural language processing algorithm; creating, based on the parsed requirement document, a plurality of code blocks for generating a structure and a design pattern to be used to develop the application by matching the one or more requirements with the available design patterns; accessing the database to obtain the code snippets for the plurality of code blocks; and automatically building an application framework based on the code snippets, but the disclosure is not limited thereto.

For example, according to exemplary embodiments, the ADM 306 embedded within the ADD 302 may be configured to solve the problems associated conventional application development processes, but the disclosure is not limited thereto.

According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the client devices 308(1)-308(n) may communicate with the ADD 302 along with the ADM 306 via broadband or cellular communication. Of course, these embodiments are merely exemplary and are not limiting or exhaustive.

FIG. 4 illustrates a system diagram for implementing an automated developer module of FIG. 3 in accordance with an exemplary embodiment. As illustrated in FIG. 4, the system 400 may include an automated developer device (ADD) 402 with an automated developer module (ADM) 406 which may include tools/modules to implement the process of automatically building an application framework by utilizing requirement document as input, thereby improving efficiency and productivity in developing an application, but the disclosure is not limited thereto. According to exemplary embodiments, the ADM 406 may be a platform which helps developers and non-developers in developing applications giving the requirement document as input and get at least 30%-60% developed product as output within no time, but the disclosure is not limited thereto. The ADM 406 may be configured to match the requirement with the available design patterns and create a strong framework at start itself, thereby reducing at least 50% of teams' effort in developing applications, but the disclosure is not limited thereto. The ADM 406 may be operationally connected to one or more client devices 408(1)-408(n), a server 404, and one or more database(s) 412 a communication network 410.

As illustrated in FIG. 4, the ADM 406 may include a receiving module 414, a parsing module 416, a creating module 418, an accessing module 420, a communication module 422, and an executing module 424, but the disclosure is not limited thereto.

According to exemplary embodiments, the client devices 408(1)-408(n) may be the same or similar to the client devices 308(1)-308(n) as illustrated in FIG. 3, the server 404 may be the same or similar to the server 304 as illustrated in FIG. 3, the database(s) 412 may be the same or similar to the database(s) 312 as illustrated in FIG. 3, and the communication network 410 may be same or similar to the communication network 310 as illustrated in FIG. 3. According to exemplary embodiments, the database(s) 312, 412 may be an internal database embedded within the ADM 306, ADM 406, respectively, but the disclosure is not limited thereto.

The process may be executed via the communication network 410 which may comprise plural networks as described above. For example, in an exemplary embodiment, the various components of the ADM 406 may communicate with the various components of the database(s) 412, server 405, and the client devices 408(1)-408(n) via the communication module 422 and the communication network 410. Of course, these embodiments are merely exemplary and are not limiting or exhaustive.

According to exemplary embodiments, each of the receiving module 414, parsing module 416, creating module 418, accessing module 420, communication module 422, and the executing module 424 may be implemented by microprocessors or similar, they may be programmed using software (e.g., microcode) to perform various functions discussed herein. Alternatively, each of the receiving module 414, parsing module 416, creating module 418, accessing module 420, communication module 422, and the executing module 424 may be implemented by dedicated hardware, or as a combination of dedicated hardware to perform some functions and a processor (e.g., one or more programmed microprocessors and associated circuitry) to perform various functions discussed herein as well as other functions. Also, according to exemplary embodiments, each of the receiving module 414, parsing module 416, creating module 418, accessing module 420, communication module 422, and the executing module 424 may be physically separated into two or more interacting and discrete blocks, units, engines, devices, and/or modules without departing from the scope of the inventive concepts.

According to exemplary embodiments, the receiving module 414 may be configured to receive, as input, a requirement document that includes one or more requirements for developing the application.

According to exemplary embodiments, the parsing module 416 may be configured to parse the requirement document by implementing a natural language processing (NLP) algorithm.

According to exemplary embodiments, the creating module 418 may be configured to create, based on the parsed requirement document parsed by the parsing module 416, a plurality of code blocks for generating a structure and a design pattern to be used to develop the application by matching the one or more requirements with the available design patterns stored in the database(s) 412.

According to exemplary embodiments, the accessing module 420 may be configured to access the database(s) 412 to obtain the code snippets for the plurality of code blocks.

According to exemplary embodiments, the executing module 424 may be configured to automatically build an application framework based on the code snippets.

According to exemplary embodiments, the application framework may be output as an at least 30%-60% developed product in completing the application.

According to exemplary embodiments, the executing module 424 may be configured to complete code implementation for all of the plurality of code blocks and automatically write unit test cases to achieve at least 90% test coverage.

According to exemplary embodiments, the receiving module 414 may be further configured to receive, as input, voice commands for generating codes that are utilized to develop the application.

Figure 5:
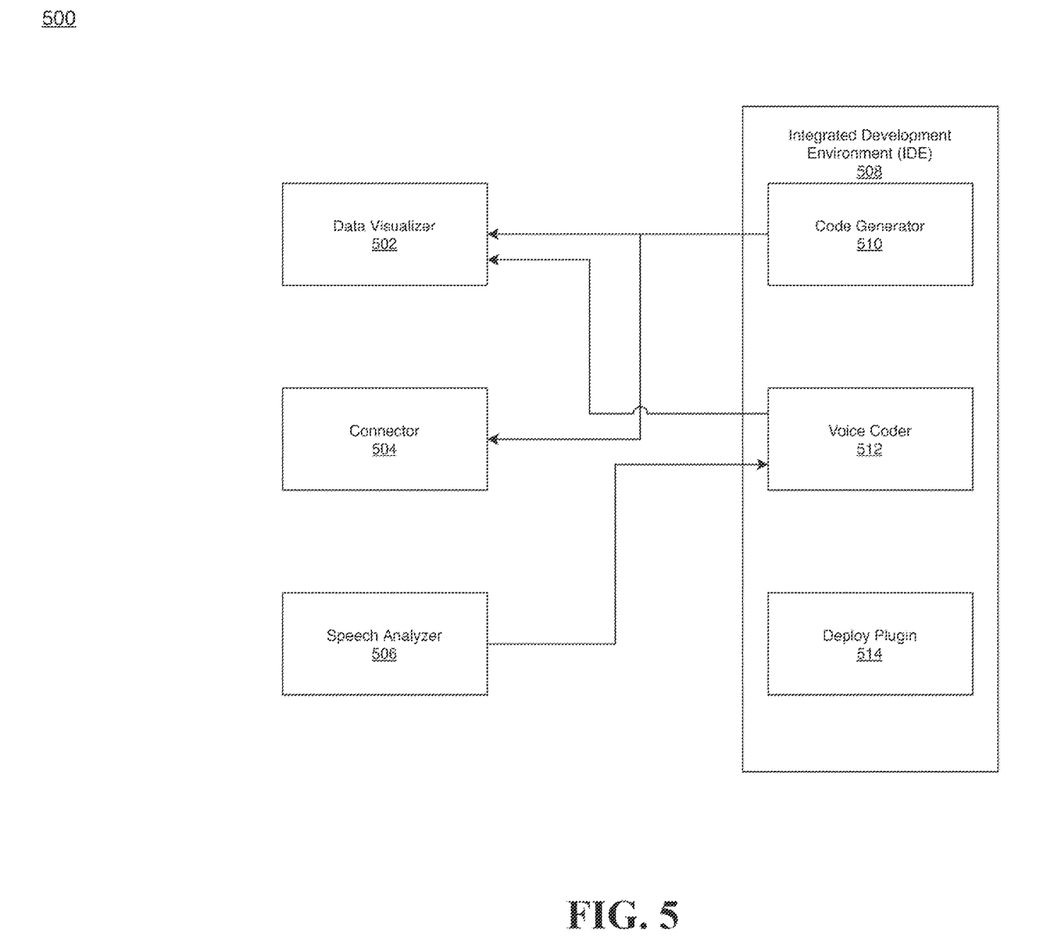
FIG. 5 illustrates a system diagram for integrated development environment (IDE) plugin in accordance with an exemplary embodiment.

FIG. 5 illustrates a system diagram for integrated development environment (IDE) plugin in accordance with an exemplary embodiment which may implement voice command features. As illustrated in FIG. 5, the system 500 may include an IDE 508 which may include a code generator 510, a voice coder 512, and a deploy plugin 514. According to exemplary embodiments, as illustrated in FIG. 5, the code generator 510 may be operatively connected to a data visualizer 502 (e.g., a GIST) and connector (e.g., a JIRA connector). The voice coder 512 may receive information from a speech analyzer 506 and send the information to the data visualizer 502.

Referring to FIGS. 4 and 5, according to exemplary embodiments, the ADM 406 may be configured to receive voice commands from voice coder device 426 which may include a speech analyzer 506. Voice coder 512 may receive, as inputs, the voice commands from the speech analyzer 506. The code generator 510 may generate code based on voice commands received by the voice coder 512.

According to exemplary embodiments, the executing module 424 may further be configured to deploying the application framework to a plurality of pools and environments at a time by utilizing the deploy plugin 514, but the disclosure is not limited thereto.

According to exemplary embodiments, the ADM 406 may be configured to implement artificial intelligence and machine learning algorithms to process the received requirement document, and build the application framework based on the requirement document.

The ADM 406 enables developers to focus lot more on the high-level development tasks by reducing the number of manual low-level commands that software developers need to execute, but the disclosure is not limited thereto. The ADM 406 also enables accessibility programmers to develop their own applications.

The ADM 406 may enable building POC with different technologies within no time. The ADM 406 may also allow syntax free development.

According to exemplary embodiments, the ADM 406 may be implemented as a plugin to IDE and act on speech commands. For example, the ADM 406 may take the input as speech commands and execute an intelligent typing of code and get the code over the Web. For example, by receiving speech command of "Write for loop," the ADM 406 may write all the "for loop" code. For example, by receiving speech command of "Write Bubble sort," the ADM 406 may get the "bubble sort algorithm," etc., but the disclosure is not limited thereto.

According to exemplary embodiments, the ADM 406 may be integrated with Jules, all IDEs, all scans, update JIST with all code, and add machine learning, but the disclosure is not limited thereto.

According to exemplary embodiments, a non-transitory computer readable medium may be configured to store instructions for implementing the ADM 406 to automatically build an application framework, but the disclosure is not limited thereto. According to exemplary embodiments, the instructions, when executed, may cause a processor embedded within the ADM 406 to perform the following: receiving, as input, a requirement document that includes one or more requirements for developing an application; parsing the requirement document by implementing a natural language processing algorithm; creating, based on the parsed requirement document, a plurality of code blocks for generating a structure and a design pattern to be used to develop the application by matching the one or more requirements with available design patterns; accessing a database to obtain the code snippets for the plurality of code blocks; and automatically building an application framework based on the code snippets. The processor may be the same or similar to the processor 104 as illustrated in FIG. 1.

According to exemplary embodiments, the instructions, when executed, may cause the processor 104 to perform the following: completing code implementation for all of the plurality of code blocks; and automatically writing unit test cases to achieve at least 90% test coverage.

According to exemplary embodiments, the instructions, when executed, may cause the processor 104 to perform the following: outputting the application framework as an at least 30%-60% developed product in completing the application.

According to exemplary embodiments, the instructions, when executed, may cause the processor 104 to perform the following: receiving, as input, voice commands for generating codes that are utilized to develop the application.

According to exemplary embodiments, the instructions, when executed, may cause the processor 104 to perform the following: deploying the application framework to a plurality of pools and environments at a time.

According to exemplary embodiments, the instructions, when executed, may cause the processor 104 to perform the following: implementing artificial intelligence and machine learning algorithms to process the received requirement document, and building the application framework based on the requirement document.

Figure 6:
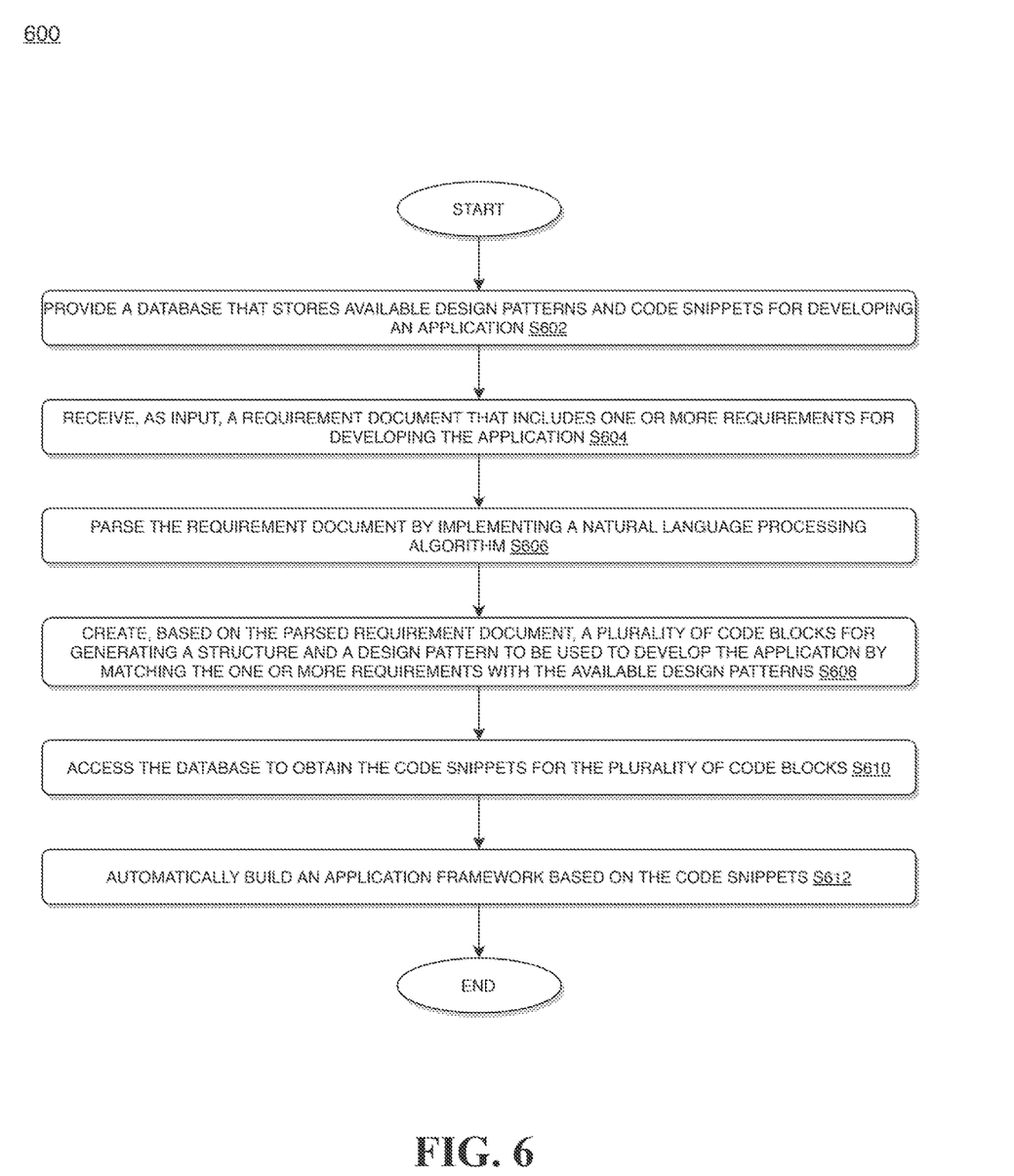
FIG. 6 illustrates a flow chart for automatically building an application framework in accordance with an exemplary embodiment.

FIG. 6 illustrates a flow chart for implementing the ADM 406 to automatically build an application framework in accordance with an exemplary embodiment. It will be appreciated that the illustrated process 600 and associated steps may be performed in a different order, with illustrated steps omitted, with additional steps added, or with a combination of reordered, combined, omitted, or additional steps.

In the process 600 of FIG. 6, at step S602, a database may be provided that stores available design patterns and code snippets for developing an application.

At step S604, a requirement document may be received as input that includes one or more requirements for developing the application.

At step S606, the requirement document may be parsed by implementing a natural language processing algorithm.

At step S608, a plurality of code blocks may be created, based on the parsed requirement document, for generating a structure and a design pattern to be used to develop the application by matching the one or more requirements with the available design patterns.

At step S610, the database may be accessed to obtain the code snippets for the plurality of code blocks.

At step S612, an application framework may be automatically built based on the code snippets, wherein the application framework may be output as an at least 30%-60% developed product in completing the application.

According to exemplary embodiments, the process 600 may further include the following: completing code implementation for all of the plurality of code blocks; and automatically writing unit test cases to achieve at least 90% test coverage.

According to exemplary embodiments, the process 600 may further include the following: receiving, as input, voice commands for generating codes that are utilized to develop the application.

According to exemplary embodiments, the process 600 may further include the following: deploying the application framework to a plurality of pools and environments at a time.

According to exemplary embodiments, the process 600 may further include the following: implementing artificial intelligence and machine learning algorithms to process the received requirement document, and building the application framework based on the requirement document.

According to exemplary embodiments as disclosed above in FIGS. 1-6, technical improvements effected by the instant disclosure may include platforms for implementing an ADM for automatically building an application framework by utilizing requirement document as input, thereby improving efficiency and productivity in developing an application, but the disclosure is not limited thereto. According to exemplary embodiments as disclosed above in FIGS. 1-6, technical improvements effected by the instant disclosure may include platforms for implementing an ADM which helps developers and non-developers in developing applications giving the requirement document as input and get at least 30%-60% developed product as output within no time, but the disclosure is not limited thereto. According to exemplary embodiments as disclosed above in FIGS. 1-6, technical improvements effected by the instant disclosure may include platforms for implementing an ADM for matching the requirement with the available design patterns and creating a strong framework at start itself, thereby reducing at least 60% of teams' effort in developing applications, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically building an application framework in an integrated development environment by utilizing one or more processors and one or more memories, the method comprising:
   parsing a requirement document that includes one or more requirements for developing an application;
   creating, by utilizing a code generator included within the integrated development environment, based on the parsed requirement document, a plurality of code blocks including code snippets, for generating a structure and a design pattern to be used to develop the application by matching one or more requirements with available design patterns stored onto a database;
   accessing the database to obtain the code snippets for the plurality of code blocks;
   automatically building an application framework based on the code snippets;
   completing code implementation for all of the plurality of code blocks;
   automatically writing unit test cases to achieve at least 90% test coverage;
   implementing artificial intelligence and machine learning algorithms to process the received requirement document; and
   implementing an automated developer module that automatically builds the application framework by utilizing the requirement document as input in the integrated development environment.

2. The method according to claim 1, wherein the application framework is output as an at least 30%-60% developed product in completing the application.

3. The method according to claim 1, further comprising:
   receiving, as input, voice commands for generating codes that are utilized to develop the application.

4. The method according to claim 1, further comprising:
   deploying the application framework to a plurality of pools and environments at a time.

5. The method according to claim 1, further comprising:
   implementing the automated developer module that matches the one or more requirements with the available design patterns and creates the framework at start itself thereby reducing at least 50% of teams' effort in developing the application.

6. The method according to claim 5, further comprising:
   building the application framework based on the requirement document.

7. A system a system for automatically building an application framework in an integrated development environment, comprising:
   a processor; and
   a memory operatively connected to the processor via a communication interface, the memory storing computer readable instructions, when executed, causes the processor to:
      parse a requirement document that includes one or more requirements for developing an application;
      create, by utilizing a code generator included within the integrated development environment, based on the parsed requirement document, a plurality of code blocks including code snippets, for generating a structure and a design pattern to be used to develop the application by matching one or more requirements with available design patterns stored onto a database;
      access the database to obtain the code snippets for the plurality of code blocks;
      automatically build an application framework based on the code snippets;
      complete code implementation for all of the plurality of code blocks;
      automatically write unit test cases to achieve at least 90% test coverage;
      implement artificial intelligence and machine learning algorithms to process the received requirement document; and
      implement an automated developer module that automatically builds the application framework by utilizing the requirement document as input in the integrated development environment.

8. The system according to claim 7, wherein the application framework is output as an at least 30%-60% developed product in completing the application.

9. The system according to claim 7, wherein the processor is further configured to:
   receive, as input, voice commands for generating codes that are utilized to develop the application.

10. The system according to claim 7, wherein the processor is further configured to:
    deploy the application framework to a plurality of pools and environments at a time.

11. The system according to claim 7, wherein the processor is further configured to:
    implement the automated developer module that matches the one or more requirements with the available design patterns and creates the framework at start itself thereby reducing at least 50% of teams' effort in developing the application.

12. The system according to claim 11, wherein the processor is further configured to:
build the application framework based on the requirement document.

13. A non-transitory computer readable medium configured to store instructions for automatically building an application framework in an integrated development environment, wherein, when executed, the instructions cause a processor to perform the following:
parsing a requirement document that includes one or more requirements for developing an application;
creating, by utilizing a code generator included within the integrated development environment, based on the parsed requirement document, a plurality of code blocks including code snippets, for generating a structure and a design pattern to be used to develop the application by matching one or more requirements with available design patterns stored onto a database;
accessing the database to obtain the code snippets for the plurality of code blocks;
automatically building an application framework based on the code snippets;
completing code implementation for all of the plurality of code blocks;
automatically writing unit test cases to achieve at least 90% test coverage; and
implementing artificial intelligence and machine learning algorithms to process the received requirement document; and
implementing an automated developer module that automatically builds the application framework by utilizing the requirement document as input in the integrated development environment.

14. The non-transitory computer readable medium according to claim 13, wherein the application framework is output as an at least 30%-60% developed product in completing the application.

15. The non-transitory computer readable medium according to claim 13, wherein the instructions, when executed, further case the processor to perform the following:
receiving, as input, voice commands for generating codes that are utilized to develop the application.

16. The non-transitory computer readable medium according to claim 13, wherein the instructions, when executed, further case the processor to perform the following:
deploying the application framework to a plurality of pools and environments at a time.

17. The non-transitory computer readable medium according to claim 13, further comprising:
implementing the automated developer module that matches the one or more requirements with the available design patterns and creates the framework at start itself thereby reducing at least 50% of teams' effort in developing the application.

* * * * *